United States Patent [19]

Drehman et al.

[11] 4,263,132

[45] Apr. 21, 1981

[54] CATALYTIC REFORMING AND HYDROCRACKING OF ORGANIC COMPOUNDS EMPLOYING PROMOTED ZINC TITANATE AS THE CATALYTIC AGENT

[75] Inventors: Lewis E. Drehman; Floyd E. Farha, Jr., both of Bartlesville, Okla.

[73] Assignee: Phillips Petroleum Company, Bartlesville, Okla.

[21] Appl. No.: 125,430

[22] Filed: Feb. 28, 1980

[51] Int. Cl.³ .................... C10G 35/04; C10G 47/02
[52] U.S. Cl. ................................. 208/134; 208/112
[58] Field of Search ............................. 208/112, 134

[56] References Cited

U.S. PATENT DOCUMENTS

| | | | |
|---|---|---|---|
| 2,279,198 | 4/1942 | Hupke | 208/134 |
| 2,393,288 | 1/1946 | Byrns | 208/46 |
| 2,591,525 | 4/1952 | Engel et al. | 208/214 |
| 3,105,811 | 10/1963 | Engel | 208/60 |
| 3,726,810 | 4/1973 | Myers | 252/441 |
| 4,128,505 | 12/1978 | Mikovsky et al. | 208/254 H |
| 4,144,277 | 3/1979 | Walker et al. | 585/433 |
| 4,176,140 | 11/1979 | Bertus et al. | 585/629 |

FOREIGN PATENT DOCUMENTS 828934  2/1960  United Kingdom .

OTHER PUBLICATIONS

Berkman et al., *Catalysis Inorganic and Organic*, Reinhold Pub. Corp., 1940, p. 295.
Carlile et al., *J. Soc. Chem. Ind.*, Oct. 1938, pp. 347–349.

*Primary Examiner*—Curtis R. Davis

[57] ABSTRACT

The catalytic reforming of a feedstock which contains at least one reformable organic compound or the hydrocracking of a feedstock which contains at least one hydrocrackable organic compound is carried out in the presence of a catalyst composition comprising zinc, titanium and rhenium.

30 Claims, No Drawings

CATALYTIC REFORMING AND HYDROCRACKING OF ORGANIC COMPOUNDS EMPLOYING PROMOTED ZINC TITANATE AS THE CATALYTIC AGENT

This invention relates to a process for reforming a feedstock which contains at least one reformable organic compound to increase the octane number of gasoline produced from the feedstock. In another aspect this invention relates to a process for hydrocracking heavy organic compounds into gasoline range materials.

Petroleum processing requires a number of separate process steps to change the petroleum feedstock into desired products. At least two initial process steps which may be utilized are reforming and hydrocracking. These process steps may occur simultaneously but are considered separate process steps in the petroleum refining art.

Reforming is the term which is utilized to refer to a number of process steps which are all designed to increase the octane number of gasoline range materials having a normal boiling range between about 50° C. and about 200° C. (generally referred to as a naphtha feedstock). The most important aspect of reforming is the dehydrogenation of cyclohexane and its derivatives to aromatics. Other aspects of reforming are the cyclization of paraffins to either cyclopentane and its derivatives or cyclohexane and its derivatives. Paraffins cyclized to cyclopentane and its derivatives are isomerized to cyclohexane and its derivatives for subsequent aromatization.

Hydrogen must be added to the reforming process to prevent the cyclopentane and its derivatives which are present in the naphtha feedstock or which are produced by the cyclization of paraffins from being converted to carbon which will very quickly foul the reforming catalyst. In the presence of hydrogen, cyclopentane and its derivatives are isomerized to cyclohexane and its derivatives. Cyclohexane and its derivatives may be dehydrogenated to aromatics and the fouling of the catalyst is substantially prevented.

Hydrocracking refers to the process of breaking carbon-carbon bonds in the presence of hydrogen. This process is utilized to make gasoline range hydrocarbons from heavier hydrocarbons. Hydrocracking catalyst will generally have a strong similarity to reforming catalyst. Both hydrocracking catalyst and reforming catalyst generally possess the dual functions of hydrogenation activity from their precious metal content and of cracking and isomerization activity by virtue of their acidity. In general, some degree of both hydrocracking and reforming will occur simultaneously. More severe conditions of temperature and pressure tend to favor hydrocarbon cracking at the expense of hydrocarbon reforming.

At present, most reforming and hydrocracking processes utilize dual function catalysts that contain platinum, either alone or in combination with other precious metals, on an acidic support such as activated alumina that contains a minor amount of chloride or fluoride ions. Catalysts containing precious metals are expensive, and it would be desirable to supplement or replace precious metals-containing catalysts for hydrocarbon reforming and hydrocracking processes. It is thus an object of this invention to provide a hydrocarbon reforming and hydrocracking process in which the precious metals-containing catalysts is replaced by a catalyst composition comprising zinc, titanium and rhenium.

In accordance with the present invention, a catalyst composition comprising zinc, titanium and rhenium is utilized as a catalyst in a hydrocarbon reforming and hydrocracking process. The reforming and hydrocracking process preferably has alternate reaction periods and regeneration periods. The reforming and hydrocracking process is carried out under suitable conditions in the substantial absence of free oxygen. Hydrogen is added to the reforming and hydrocracking process. The catalyst regeneration process is carried out in the presence of a free oxygen-containing gas to remove carbonaceous material which may have formed on the catalyst during the reforming and hydrocracking process.

The use of catalyst composition comprising zinc, titanium and rhenium as the catalyst in a reforming and hydrocracking process results in a reduced expense due to the reduced use of precious metals-containing catalyst. The presence of the rhenium results in increase in hydrocracking activity over that obtainable using a catalyst composition comprising only zinc and titanium.

Other objects and advantages of the invention will be apparent from the foregoing brief description of the invention and the appended claims, as well as the detailed description of the invention which follows.

Any suitable reformable organic compound can be reformed in accordance with the present invention. Organic compounds which are considered to be advantageously and efficiently reformed in accordance with the process of this invention are the gasoline range materials having a normal boiling range between about 50° C. and about 205° C. Examples of the gasoline range materials suitable for reforming include cyclopentane and its derivatives, cyclohexane and its derivatives, n-heptane, n-octane, n-nonane, monomethyl derivatives of n-heptane, n-octane, n-nonane and the like, and mixtures of any two or more thereof.

Any suitable hydrocrackable organic compound can be hydrocracked in accordance with the present invention. Organic compounds which are considered to be advantageously and efficiently hydrocracked in accordance with the process of this invention are generally gas oils having a normal boiling range between about 205° C. and about 535° C.

It is noted that some hydrocracking will occur for gasoline range materials having a normal boiling range between about 50° C. and about 205° C. Preferably hydrocracking is minimized for gasoline range materials because the octane number is decreased by hydrocracking.

The feedstock may contain sulfur compounds without impairing the activity of the catalyst. However, sulfur will generally be converted to hydrogen sulfide at reforming and hydrocracking conditions. Thus, it is preferable to use desulfurized feed to obviate the need for removal of the hydrogen sulfide downstream from the reformer.

The reforming and hydrocracking catalyst employed in the process of the present invention is a composition consisting essentially of zinc, titanium and rhenium. Sufficient oxygen is present in the catalyst composition to satisfy the valence requirements of the zinc, titanium and rhenium. The zinc and titanium are generally present in the catalyst composition in the form of zinc titanate.

The zinc titanate base of the catalyst composition may be prepared by intimately mixing suitable portions of zinc oxide and titanium dioxide, preferably in a liquid such as water, and calcining the mixture in the presence of free oxygen at a temperature in the range of about 650° C. to about 1050° C., preferably in the range of about 675° C. to about 975° C. A calcining temperature in the range of about 800° C. to about 850° C. is most preferred because the surface area of the catalyst is maximized in this temperature range, thus producing a more active catalyst. The titanium dioxide used in preparing the zinc titanate preferably has extremely fine particle size to promote intimate mixing of the zinc oxide and titanium dioxide. This produces a rapid reaction of the zinc oxide and titanium dioxide which results in a more active catalyst. Preferably the titanium dioxide has an average particle size of less than 100 millimicrons and more preferably less than 30 millimicrons. Flame hydrolyzed titanium dioxide has extremely small particle size and is particularly preferred in preparing the catalyst. The atomic ratio of zinc to titanium can be any suitable ratio. The atomic ratio of zinc to titanium will generally lie in the range of about 1:1 to about 3:1 and will preferably lie in the range of about 1.8:1 to about 2.2:1 because the activity of the catalyst is greatest for atomic ratios of zinc to titanium in this range. The term "zinc titanate" is used regardless of the atomic ratio of zinc to titanium.

The zinc titanate base of the catalyst composition may also be prepared by coprecipitation from aqueous solutions of a zinc compound and a titanium compound. The aqueous solutions are mixed together and the hydroxides are precipitated by the addition of ammonium hydroxide. The precipitate is then washed, dried and calcined as described in the preceding paragraph. This method of preparation is less preferred than the mixing method because the zinc titanate prepared by the coprecipitation method is softer than the zinc titanate prepared by the mixing method.

The concentration of the rhenium, expressed as an element, can be any suitable concentration. The concentration of the rhenium, expressed as an element, will generally be in the range of about 0.1 to about 10 weight percent, preferably in the range of about 0.5 to about 5 weight percent and more preferably about 1 weight percent based on the weight of the total catalyst composition.

The rhenium may be combined with the zinc titanate by any method known in the art. The preferred method of combining rhenium with zinc titanate is by impregnating the preformed zinc titanate with a solution of a suitable rhenium compound. However, finely divided solid rhenium compounds may be mixed with the zinc titanate to prepare the catalyst of this invention. It is noted that addition of the rhenium to the zinc oxide and titanium oxide prior to formation of the zinc titanate is undesirable because a substantial portion of the rhenium will be volatilized as rhenium heptoxide at the temperatures required to form the zinc titanate.

Elemental rhenium or any rhenium compound convertible to an oxide of rhenium may be added to the zinc titanate base. Suitable compounds of rhenium include ammonium perrhenate, perrhenic acid, rhenium (VI) oxide, rhenium (VII) oxide, rhenium disulfide, and the like and mixtures of any two or more thereof. Halogen-containing rhenium compounds are suitable but are generally less desirable because of the corrosive action of halogen compounds on process equipment.

After adding the rhenium compound to the zinc titanate base of the catalyst composition, it is preferred to heat the resulting catalyst composition in a free oxygen-containing environment at a temperature suitable to convert the rhenium to its oxide. Preferably the temperature is in the range of about 500° C. to about 650° C. More preferably the temperature is about 540° C., to activate properly the promoted catalyst in a reasonable time without risking unnecessary loss of the rhenium oxide. After this treatment, the catalyst is ready for use in the reforming and hydrocracking process. It is noted that it is not required to calcine the catalyst composition prior to use. However, the rhenium will generally be converted to its oxide form in the regeneration process.

The process of this invention can be carried out by means of any apparatus whereby there is achieved an alternate contact of the catalyst with the organic compound to be reformed and hydrocracked and thereafter of the catalyst with the oxygen-containing gas. The process is in no way limited to the use of a particular apparatus. The process of this invention can be carried out using a fixed catalyst bed, fluidized catalyst bed or moving catalyst bed. Presently preferred is a fixed catalyst bed.

In order to avoid any casual mixing of the organic feed and the oxygen-containing fluid utilized in the regeneration step, provision is preferably made for terminating the flow of feed to the reactor and injecting an inert purging fluid such as nitrogen, carbon dioxide or steam. Any purge time suitable to prevent mixing of the organic feed and the oxygen-containing fluid can be utilized. The purge duration will generally range from about 1 minute to about 10 minutes and will more preferably range from about 3 minutes to about 6 minutes. Any suitable flow rate of the purge gas may be utilized. Presently preferred is a purge fluid flow rate in the range of about 800 GHSV to about 1200 GHSV.

Any suitable temperature for reforming and hydrocracking organic compounds over the promoted zinc titanate catalyst can be utilized. The reforming and hydrocracking temperature will generally be in the range of about 427° to about 593° C. and will more preferably be in the range of about 510° to about 566° C. As has been previously stated, hydrocracking and reforming will occur simultaneously, with the higher temperatures favoring hydrocracking and the lower temperatures favoring reforming.

Any suitable pressure for the reforming and the hydrocracking of the organic feedstock over the promoted zinc titanate catalyst can be utilized. In general, the pressure will be in the range of about 50 to about 700 psig and will more preferably be in the range of about 200 to about 500 psig. The pressure will be in terms of total system pressure where total system pressure is defined as the sum of the partial pressures of the organic feedstock, the hydrogen added to the process and the hydrogen produced in the process. The higher pressures will favor hydrocracking while the lower pressures will favor reforming.

Any quantity of hydrogen suitable for substantially preventing the formation of coke can be added to the reforming and hydrocracking process. The quantity of hydrogen added will generally be in the range of about 0.5 to about 20 moles per mole of hydrocarbon feed and will more preferably be in the range of about 2 to about 10 moles of hydrogen per mole of feed.

Any suitable residence time for the feedstock in the presence of the promoted zinc titanate catalyst can be utilized. In general, the residence time in terms of the volume of liquid feedstock per unit volume of catalyst per hour (LHSV) will be in the range of about 0.1 to about 10 and will more preferably be in the range of about 0.5 to about 5. Longer residence time (smaller LHSV) will favor hydrocracking.

Any suitable time for the regeneration of the reforming and hydrocracking catalyst can be utilized. The time for the regeneration of the reforming and hydrocracking catalyst will generally range from about 5 minutes to about 60 minutes and will more preferably range from about 10 minutes to about 30 minutes. The regeneration effluent should be substantially free of carbon dioxide at the end of the regeneration period.

The amount of oxygen, from any source, supplied during the regeneration step will be at least the amount sufficient to remove substantially all carbonaceous materials from the catalyst. The regeneration step can be conducted at the same temperature and pressure recited for the reforming and hydrocracking step although somewhat higher temperatures can be used, if desired.

Catalysis of reforming and hydrocracking reactions with promoted zinc titanate is most effective with the use of relatively short process periods with intervening periods of oxidative regeneration. The duration of the reforming and hydrocracking process period will generally be in the range of about 1 minute to about 4 hours with a duration of about 5 minutes to about 60 minutes being preferred.

The operating cycle for the reforming and hydrocracking process will generally include the successive steps of:

(1) contacting the feed with the catalyst to thereby reform and hydrocrack the feed;
(2) terminating the flow of the feed to the reactor;
(3) optionally, purging the catalyst with an inert fluid;
(4) contacting the catalyst with free oxygen to regenerate the catalyst;
(5) terminating the flow of free oxygen to the reactor; and
(6) optionally, purging the thus regenerated catalyst with an inert fluid before repeating step (1).

The following examples are presented in further illustration of the invention.

EXAMPLE I

Zinc titanate having an atomic ratio of Zn:Ti=2.00:1 was prepared by mixing 162 g (1.99 moles) of Mallinckrodt powdered zinc oxide and 80 g (1.00 mole) of Degussa P-25 titanium dioxide (flame hydrolyzed) by slurrying in 1200 ml water in a blender for 15 minutes. The resulting slurry was oven dried at 105° C. and then calcined in air for 3 hours at 816° C. After cooling, the thus calcined material was crushed and a −20+40 mesh fraction retained. A 25-g portion of this fraction was then treated with 25 ml of aqueous perrhenic acid (HReO$_4$) that contained 0.010 g Re/ml. After mixing, the perrhenic acid treated material was oven dried at 110° C. and then calcined in air for 3 hours at 650° C. The resulting catalyst composition contained one weight percent rhenium based on the weight of the total catalyst composition. It is noted that the volatility of rhenium heptoxide is greatly reduced by depositing it on a substrate such as zinc titanate.

The zinc titanate catalyst composition containing 1 weight percent rhenium based on the weight of the total catalyst composition was tested to hydrocrack and reform n-heptane. Normally, it would not be desirable to hydrocrack n-heptane. However, the hydrocracking of the n-heptane is an example of the hydrocracking activity of the catalyst of the present invention.

Hydrogen gas and n-heptane were metered into a ⅜" pipe reactor having a length of 7" and passed downflow over 20 ml (17.8 g) of catalyst in the pipe reactor. The pipe reactor was heated in a temperature controlled fluidized sand bath. Products from the reactor passed to a separator maintained at 30 psig and 25° C. to separate gaseous and liquid products. Reaction was conducted in a cyclic mode utilizing 30 minute process periods and 30 minute regeneration periods. Both the process period and the regeneration period were carried out at the same temperature. During the process cycle, gas was sampled continuously and collected in a container. The gas was analyzed at the conclusion of each run. Likewise, liquid collected in the separator was analyzed at the conclusion of each run. Gas from the regeneration cycle was vented.

The zinc titanate catalyst composition which contained 1 weight percent rhenium based on the weight of the total catalyst composition was also tested to hydrocrack and reform a straight run naphtha having an average molecular weight of 103.2. Again, it would generally not be desirable to hydrocrack a straight run naphtha but the hydrocracking of the straight run naphtha again demonstrates the hydrocracking activity of the catalyst of the present invention. Hydrogen gas and the straight run naphtha were metered into a ⅜" pipe reactor having a length of 7" and passed downflow over 20 ml (17.8 g) of catalyst in the pipe reactor. The pipe reactor was heated in a temperature controlled fluidized sand bath. Product from the reactor passed to a separator maintained at 50 psig and 25° C. to separate gaseous and liquid products. The reaction was conducted in a cyclic mode using 15 minute process periods and 15 minute regeneration periods. Both the process periods and the regeneration periods were carried out at the same temperature. During the process periods, gas was sampled continuously and collected in a container. The composite sample of gas collected in the container was analyzed at the conclusion of each run. Likewise, liquid collected in the separator was analyzed at the conclusion of each run. Gas from the regeneration periods was vented.

Table I contains primary data collected in run number one set forth in Table II with n-heptane to exemplify the measurements that were made in each run set forth in Table II. GLC analyses provided the composition of the feed, of "Gas-observed" and of "Liquid-observed." The composition of "Gas-corrected" has been calculated on a nitrogen and oxygen free basis and, in addition, the contribution to the gas phase of compounds heavier than heptane was computed from experimentally determined Henry's Law constants based on conditions at the separator. The composition labelled "Total" is calculated from the gas and liquid, weighted by the charge and product rates shown at the bottom of Table I.

TABLE I

| | Concentration, Mole % | | | | |
|---|---|---|---|---|---|
| | | Gas | | Liquid | |
| Component | Feed | Obs'd | Corr'd | Obs'd | Total |
| Oxygen | | 0.38 | | | |
| Nitrogen | | 0.62 | 0 | | 0 |
| Hydrogen | | 61.45 | 63.68 | | 47.37 |
| Carbon Monoxide | | 0 | 0 | | 0 |
| Carbon Dioxide | | 0.14 | 0.15 | | 0.11 |
| Methane | | 15.29 | 15.85 | 0 | 23.30 |

TABLE I-continued

| | | Concentration, Mole % | | | |
|---|---|---|---|---|---|
| | | Gas | | Liquid | |
| Component | Feed | Obs'd | Corr'd | Obs'd | Total |
| Ethane | | 7.99 | 8.28 | 0.04 | 8.40 |
| Propane | | 4.50 | 4.66 | 0.36 | 5.94 |
| iso-Butane | | 0.53 | 0.55 | 0.23 | 0.78 |
| n-Butane | | 2.44 | 2.53 | 1.83 | 3.64 |
| iso-Pentane | | 1.00 | 1.04 | 1.83 | 1.54 |
| n-Pentane | | 0.89 | 0.92 | 3.61 | 1.61 |
| Cyclopentane | | 0.02 | 0.02 | 1.48 | 0.22 |
| iso-Hexanes | | 0.45 | 0.47 | 2.72 | 0.68 |
| n-Hexane | | 0.43 | 0.45 | 4.81 | 1.07 |
| $C_6$ Naphthenes | | 0 | 0 | 0 | 0 |
| iso-Heptanes | | 0.55 | 0.56 | 19.20 | 1.45 |
| n-Heptane | 99.00 | 0.34 | 0.42 | 21.04 | 1.31 |
| $C_7$ Naphthenes | | | 0.05 | 2.44 | 0.15 |
| iso-Octanes | | 0 | | | 0 |
| n-Octane | | 0 | | | 0 |
| $C_8$ Naphthenes | | 0 | | | 0 |
| iso-Nonanes | | 0 | | | 0 |
| n-Nonane | | 0 | | | 0 |
| $C_9$ Naphthenes | | 0 | | | 0 |
| iso-Decanes | | 0 | | | 0 |
| n-Decane | | 0 | | | 0 |
| Benzene | 1.00 | 0.05 | | 2.69 | 0.16 |
| Toluene | | 0.14 | | 35.92 | 1.39 |
| $C_8$ Aromatics | | 0 | | 1.66 | 0.06 |
| $C_9$ Aromatics | | 0 | | | 0 |
| $C_{10}$ Aromatics | | 0 | | | 0 |
| $C_{11} + C_{12}$ | | 0 | | | 0 |
| Coke | | | | | 0.81 |
| Total | 100.00 | 100.01 | 100.00 | 99.86 | 100.00 |

Reactor Charge:
n-Heptane 263 ml = 181.6 g = 1.8209 moles
Hydrogen 17.9 L/hr.
Nitrogen flush 1.1 L/hr.
Regeneration air 22.7 L/hr.
Reactor Product:
Gas 241.69 L × 0.872 (23° C., 740 torr)
Liquid 53.0 ml = 38.3 g = 0.4135 moles Table II summarizes experimental conditions and pertinent results from two runs made with n-heptane and from three runs made with the naphtha.

TABLE II

| Run | 1 | 2 | 3 | 4 | 5 |
|---|---|---|---|---|---|
| Feed | n-Heptane | | | Naphtha | |
| Temperature, °C. | 538 | 427 | 538 | 538 | 538 |
| Pressure, psig | 200 | 200 | 100 | 200 | 300 |
| Period length, hrs. | 0.5 | 0.5 | 0.25 | 0.25 | 0.25 |
| Feed rate, LHSV | 1.27 | 1.15 | 1.66 | 1.20 | 1.02 |
| $H_2$ rate, moles/mole feed | 4.81 | 4.40 | 4.84 | 3.93 | 4.91 |
| $H_2$ rate, SCF/bbl feed | 4400 | 4000 | 4500 | 3700 | 4600 |
| Yield based on charge | | | | | |
| $H_2$, SCF/bbl | −800 | −3000 | 670 | 250 | −2430 |
| $C_1$—$C_4$, SCF/bbl | 1800 | 2000 | 280 | 1000 | 3340 |
| Mole % $CH_4$ in $C_1$—$C_4$ | 49.6 | 41.2 | 49.2 | 57.3 | 71.3 |
| $CO_x$, wt. % | 0.4 | 0.3 | 0.5 | 1.3 | 0.8 |
| Coke, wt. % | 0.8 | 0.5 | 1.6 | 1.4 | 1.2 |
| RON of $C_5+$ | — | — | 54 | 75 | 98 |
| n-Heptane conversion, % | 92.0 | 65.6 | — | — | — |
| $C_5+$, vol % | 44.5 | 51.0 | 85.4 | 66.3 | 22.5 |
| Selectivity to | | | | | |
| Cracking, wt. % | 74.8 | 95.8 | — | — | — |
| Isomerization, wt. % | 9.6 | 3.1 | — | — | — |
| Dehydrogenation, wt. % | 1.1 | Trace | — | — | — |
| Aromatics, wt. % | 13.1 | 0.1 | — | — | — |
| Coke, wt. % | 1.1 | 0.9 | — | — | — |

— not measured.

Runs 1 and 2 show the effect of two different temperatures on treating n-heptane at otherwise very similar conditions. Comparing runs 1 and 2, the higher temperature effects greater conversion, with increased selectivity to aromatics and isomerized heptane. Hydrocracking activity as indicated by the yields of light hydrocarbons ($C_1$-$C_4$) at the two temperatures is quite similar for Runs 1 and 2. Higher temperature mekes appreciably more methane in the friction. Substantially less hydrogen is consumed at the higher temperature because of its greatly increased yield that accompanies the production of aromatics.

Runs 3, 4 and 5 show the effects of three different pressures, at constant temperature, on processing a straight run naphtha. Conversion is very sensitive to pressure, as shown by the yield of $C_5+$ product decreasing with increasing pressure. The calculated research octane number (RON) of these three products suggests that the $C_5+$ fraction becomes increasingly aromatic (at the expense of yield) with increasing pressure. The extent of hydrocracking as indicated by hydrogen production, by light hydrocarbon ($C_1$-$C_4$) production, and by yield of methane, is shown to increase very markedly as the system pressure is increased from 100 to 300 psig.

EXAMPLE II

As a comparison, a zinc titanate catalyst without rhenium was prepared by mixing 22 g (0.270 moles) of Mallinckrodt powdered zinc oxide and 12 g (0.15 moles) of Cab-O-Ti titanium dioxide (flame hydrolyzed) by slurrying in 150 ml of water in a blender for 5 minutes. The resulting slurry was dried in an oven at 105° C., then calcined in air for three hours at 816° C. After cooling, the thus calcined material was crushed and screened. A −16+40 mesh fraction of the thus screened catalyst was reserved for testing. The atomic ratio of zinc:titanium in this preparation was 1.8:1.

The Cab-O-Ti titanium dioxide is substantially identical to the Degussa P-25 titanium dioxide which was used in the preparation of the catalyst of Example I. The small difference between the catalyst particle size in Examples I and II is not considered to affect significantly the comparison between the two catalysts.

The zinc titanate catalyst without rhenium was used to reform and hydrocrack straight run naphtha having a number average molecular weight of 108.9 and a calculated research octane number (RON) of 49.2. Naphtha and hydrogen were metered into a ⅜" pipe reactor having a length of 7" and passed downflow over 20 ml (26.5 g) of catalyst in the pipe reactor. The reactor was heated in a temperature-controlled fluidized sand bath. Product from the reactor passed to a separator maintained at 100 psig and 25° C. temperature to separate gaseous and liquid product. Reaction was conducted in a cyclic mode, as follows: 14 minutes reforming and hydrocracking process, 2 minutes purge with nitrogen, 12 minutes regeneration with free oxygen-containing gas, and 2 minutes purge with nitrogen. The 30 minute cycles were made at constant temperature. During the entire run a constant fraction of the effluent gas was collected in a single container. At the conclusion of each run the composite sample of the effluent gas collected in the container, and the liquid accumulated in the separator, were each analyzed by gas-liquid chromatography (GLC). Data was collected and manipulated as is set forth in Table I and described in Example I.

Table III summarizes experimental conditions and pertinent results of eight runs made to reform and hydrocrack the straight run naphtha over the unpromoted zinc titanate catalyst.

TABLE III

| Run | 1 | 2 | 3 | 4 | 5 | 6 | 7 | 8 |
|---|---|---|---|---|---|---|---|---|
| Catalyst Age. Hrs. | 0–17 | 17–25 | 25–33 | 33–49 | 49–57 | 57–73 | 73–99 | 99–122 |
| Cycles | 34 | 16 | 16 | 32 | 16 | 32 | 52 | 46 |
| Temp., °C. | 541 | 541 | 541 | 541 | 541 | 542 | 542 | 540 |
| Press., psig | 105 | 105 | 203 | 205 | 300 | 300 | 500 | 500 |
| LHSV | 2.17 | 2.21 | 1.72 | 1.77 | 1.53 | 1.66 | 0.93 | 1.30 |
| $H_2$: naphtha, molar ratio | 4.32 | 4.10 | 5.59 | 5.23 | 4.81 | 5.27 | 5.51 | 4.74 |
| Yield/bbl feed | | | | | | | | |
| $H_2$, SCF | 944 | 869 | 906 | 995 | 828 | 657 | 421 | 310 |
| $C_1$—$C_4$, SCF | 162 | 149 | 280 | 279 | 290 | 426 | 593 | 597 |
| Net Aromatics | 0.247 | 0.237 | 0.311 | 0.305 | 0.277 | 0.255 | 0.212 | 0.208 |
| $C_5+$ gasoline, bbl | 0.866 | 0.870 | 0.828 | 0.824 | 0.825 | 0.786 | 0.727 | 0.738 |
| Coke, lb | 4.4 | 4.5 | 4.0 | 5.1 | 3.4 | 4.8 | 6.9 | 3.5 |
| RON, clear | 74.3 | 73.6 | 85.0 | 85.1 | 83.9 | 84.1 | 84.1 | 82.0 |

Runs 3 and 4 of Table III are directly comparable to Run 4 of Table II. Runs 5 and 6 of Table III are directly comparable to Run 5 of Table II. A comparison of these runs indicates that the promoted zinc titanate catalyst exhibits substantially increased hydrocracking activity over the unpromoted zinc titanate catalyst. This is especially pointed out by the yield of hydrogen and the yield of the light hydrocarbons ($C_1$-$C_4$).

Reasonable variations and modifications are possible within the scope of the disclosure and the appended claims to the invention.

That which is claimed is:

1. A process for the catalytic reforming of a feedstock which contains at least one reformable organic compound comprising the step of contacting said feedstock under suitable reforming conditions with a catalyst composition comprising zinc, titanium and rhenium, in the presence of sufficient added hydrogen to substantially prevent the formation of coke.

2. A process in accordance with claim 1 wherein said catalyst composition is a calcined catalyst composition and sufficient oxygen is present in said calcined catalyst composition to satisfy the valence requirements of said zinc, said titanium and said rhenium.

3. A process in accordance with claim 2 wherein said zinc and said titanium are present in said calcined catalyst composition in the form of zinc titanate which is prepared by calcining a mixture of zinc oxide and titanium dioxide in the presence of free oxygen at a temperature in the range of about 650° C. to about 1050° C.

4. A process in accordance with claim 3 wherein the atomic ratio of zinc to titanium in said calcined catalyst composition is in the range of about 1:1 to about 3:1.

5. A process in accordance with claim 3 wherein the atomic ratio of zinc to titanium in said calcined catalyst composition is in the range of about 1.8:1 to about 2.2:1.

6. A process in accordance with claim 3 wherein the concentration of said rhenium in said calcined catalyst composition, expressed as an element, is in the range of about 0.1 to about 10 weight percent based on the weight of said calcined catalyst composition.

7. A process in accordance with claim 3 wherein the concentration of said rhenium in said calcined catalyst composition, expressed as an element, is in the range of about 0.5 to about 5 weight percent based on the weight of said calcined catalyst composition.

8. A process in accordance with claim 1 wherein said at least one reformable organic compound is a gasoline range material having a normal boiling range between about 50° C. and about 205° C.

9. A process in accordance with claim 1 wherein said suitable reforming conditions comprise a residence time for said feedstock in the presence of said catalyst composition of about 0.1 to about 10 liquid volumes of feedstock per unit volume of said catalyst composition per hour, a temperature in the range of about 427° C. to about 593° C., a pressure in the range of about 50 psig to about 700 psig, and a hydrogen flow rate suitable to provide about 0.5 mole to about 20 moles of hydrogen per mole of said feedstock.

10. A process in accordance with claim 1 wherein said suitable reforming conditions comprise a residence time for said feedstock in the presence of said catalyst composition of about 0.5 to about 5 liquid volumes of feedstock per unit volume of said catalyst composition per hour, a temperature in the range of about 510° C. to about 566° C., a pressure in the range of about 200 psig to about 500 psig, and a hydrogen flow rate suitable to provide about 2 moles to about 10 moles of hydrogen per mole of said feedstock.

11. A process in accordance with claim 1 additionally comprising the steps of:
  discontinuing the flow of said feedstock over said catalyst composition; and
  contacting said catalyst composition, after the flow of said feedstock is discontinued, with a free oxygen-containing fluid under suitable regeneration conditions to thereby regenerate said catalyst composition.

12. A process in accordance with claim 11 wherein said suitable regeneration conditions comprise a regeneration time of about 5 minutes to about 60 minutes; a flow rate of said free oxygen-containing fluid suitable to provide sufficient oxygen to remove substantially all carbonaceous material deposited on said catalyst composition, a temperature in the range of about 427° C. to about 593° C., and a pressure in the range of about 50 psig to about 700 psig.

13. A process in accordance with claim 11 wherein said suitable regeneration conditions comprise a regeneration time of about 10 minutes to about 30 minutes; a flow rate of said free oxygen-containing fluid suitable to provide sufficient oxygen to remove substantially all carbonaceous material deposited on said catalyst composition, a temperature in the range of about 510° C. to about 566° C., and a pressure in the range of about 200 psig to about 500 psig.

14. A process in accordance with claim 11 additionally comprising the step of purging said catalyst composition with an inert fluid after the step of terminating the flow of said feedstock and before the step of regenerating said catalyst composition.

15. A process in accordance with claim 11 additionally comprising the steps of:

terminating the flow of said free oxygen-containing fluid over said catalyst composition after said catalyst composition is substantially regenerated;

purging said catalyst composition with an inert fluid after the flow of said free oxygen-containing fluid is terminated;

terminating the flow of said inert fluid over said catalyst composition after said free oxygen-containing fluid is substantially purged from said catalyst composition; and recontacting said catalyst composition with said feedstock after the flow of said inert fluid is terminated.

16. A process for the catalytic hydrocracking of a feedstock which contains at least one hydrocrackable organic compound comprising the step of contacting said feedstock under suitable hydrocracking conditions with a catalyst composition comprising zinc, titanium and rhenium, in the presence of sufficient added hydrogen to substantially prevent the formation of coke.

17. A process in accordance with claim 16 wherein said catalyst composition is a calcined catalyst composition and sufficient oxygen is present in said calcined catalyst composition to satisfy the valence requirements of said zinc, said titanium and said rhenium.

18. A process in accordance with claim 17 wherein said zinc and said titanium are present in said calcined catalyst composition in the form of zinc titanate which is prepared by calcining a mixture of zinc oxide and titanium dioxide in the presence of free oxygen at a temperature in the range of about 650° C. to about 1050° C.

19. A process in accordance with claim 18 wherein the atomic ratio of zinc to titanium in said calcined catalyst composition is in the range of about 1:1 to about 3:1.

20. A process in accordance with claim 18 wherein the atomic ratio of zinc to titanium in said calcined catalyst composition is in the range of about 1.8:1 to about 2.2:1.

21. A process in accordance with claim 18 wherein the concentration of said rhenium in said calcined catalyst composition, expressed as an element, is in the range of about 0.1 to about 10 weight percent based on the weight of said calcined catalyst composition.

22. A process in accordance with claim 18 wherein the concentration of said rhenium in said calcined catalyst composition, expressed as an element, is in the range of about 0.5 to about 5 weight percent based on the weight of said calcined catalyst composition.

23. A process in accordance with claim 16 wherein said at least one hydrocrackable organic compound is a gas oil having a normal boiling range between about 205° C. and about 535° C.

24. A process in accordance with claim 16 wherein said suitable hydrocracking conditions comprise a residence time for said feedstock in the presence of said catalyst composition of about 0.1 to about 10 liquid volumes of feedstock per unit volume of said catalyst composition per hour, a temperature in the range of about 427° C. to about 593° C., a pressure in the range of about 50 psig to about 700 psig, and a hydrogen flow rate suitable to provide about 0.5 mole to about 20 moles of hydrogen per mole of said feedstock.

25. A process in accordance with claim 16 wherein said suitable hydrocracking conditions comprise a residence time for said feedstock in the presence of said catalyst composition of about 0.5 to about 5 liquid volumes of feedstock per unit volume of said catalyst composition per hour, a temperature in the range of about 510° C. to about 566° C., a pressure in the range of about 200 psig to about 500 psig, and a hydrogen flow rate suitable to provide about 2 moles to about 10 moles of hydrogen per mole of said feedstock.

26. A process in accordance with claim 16 additionally comprising the steps of:

discontinuing the flow of said feedstock over said catalyst composition; and contacting said catalyst composition, after the flow of said feedstock is discontinued, with a free oxygen-containing fluid under suitable regeneration conditions to thereby regenerate said catalyst composition.

27. A process in accordance with claim 26 wherein said suitable regeneration conditions comprise a regeneration time of about 5 minutes to about 60 minutes; a flow rate of said free oxygen-containing fluid suitable to provide sufficient oxygen to remove substantially all carbonaceous material deposited on said catalyst composition, a temperature in the range of about 427° C. to about 593° C., and a pressure in the range of about 50 psig to about 700 psig.

28. A process in accordance with claim 26 wherein said suitable regeneration conditions comprise a regeneration time of about 10 minutes to about 30 minutes; a flow rate of said free oxygen-containing fluid suitable to provide sufficient oxygen to remove substantially all carbonaceous material deposited on said catalyst composition, a temperature in the range of about 510° C. to about 566° C., and a pressure in the range of about 200 psig to about 500 psig.

29. A process in accordance with claim 26 additionally comprising the step of purging said catalyst composition with an inert fluid after the step of terminating the flow of said feedstock and before the step of regenerating said catalyst composition.

30. A process in accordance with claim 26 additionally comprising the steps of:

terminating the flow of said free oxygen-containing fluid over said catalyst composition after said catalyst composition is substantially regenerated;

purging said catalyst composition with an inert fluid after the flow of said free oxygen-containing fluid is terminated;

terminating the flow of said inert fluid over said catalyst composition after said free oxygen-containing fluid is substantially purged from said catalyst composition; and recontacting said catalyst composition with said feedstock after the flow of said inert fluid is terminated.

* * * * *